Sept. 12, 1950 P. R. McEACHRAN 2,521,988
BRAKE SHOE CONSTRUCTION
Filed Feb. 21, 1945 3 Sheets-Sheet 2
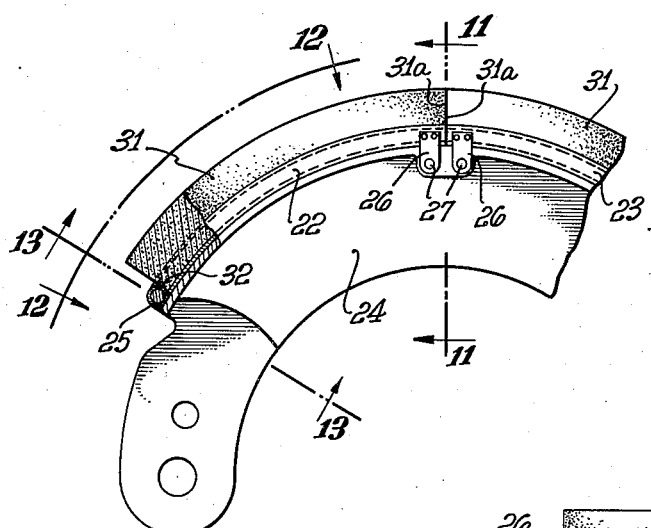
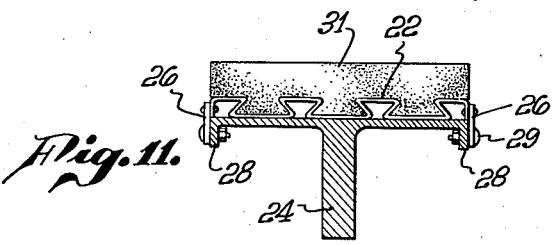
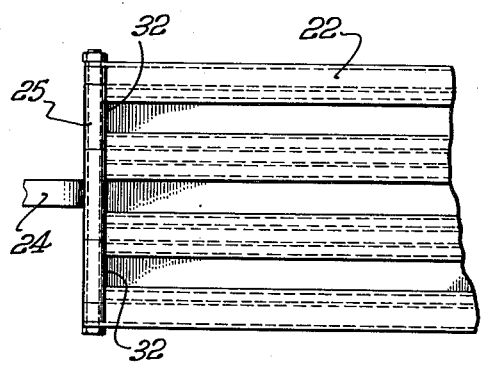
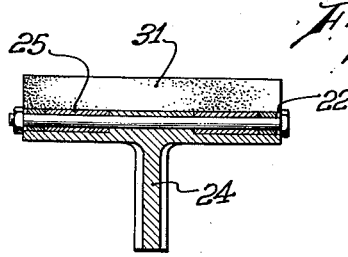
PAUL R. McEACHRAN,
INVENTOR.
BY
ATTORNEY.

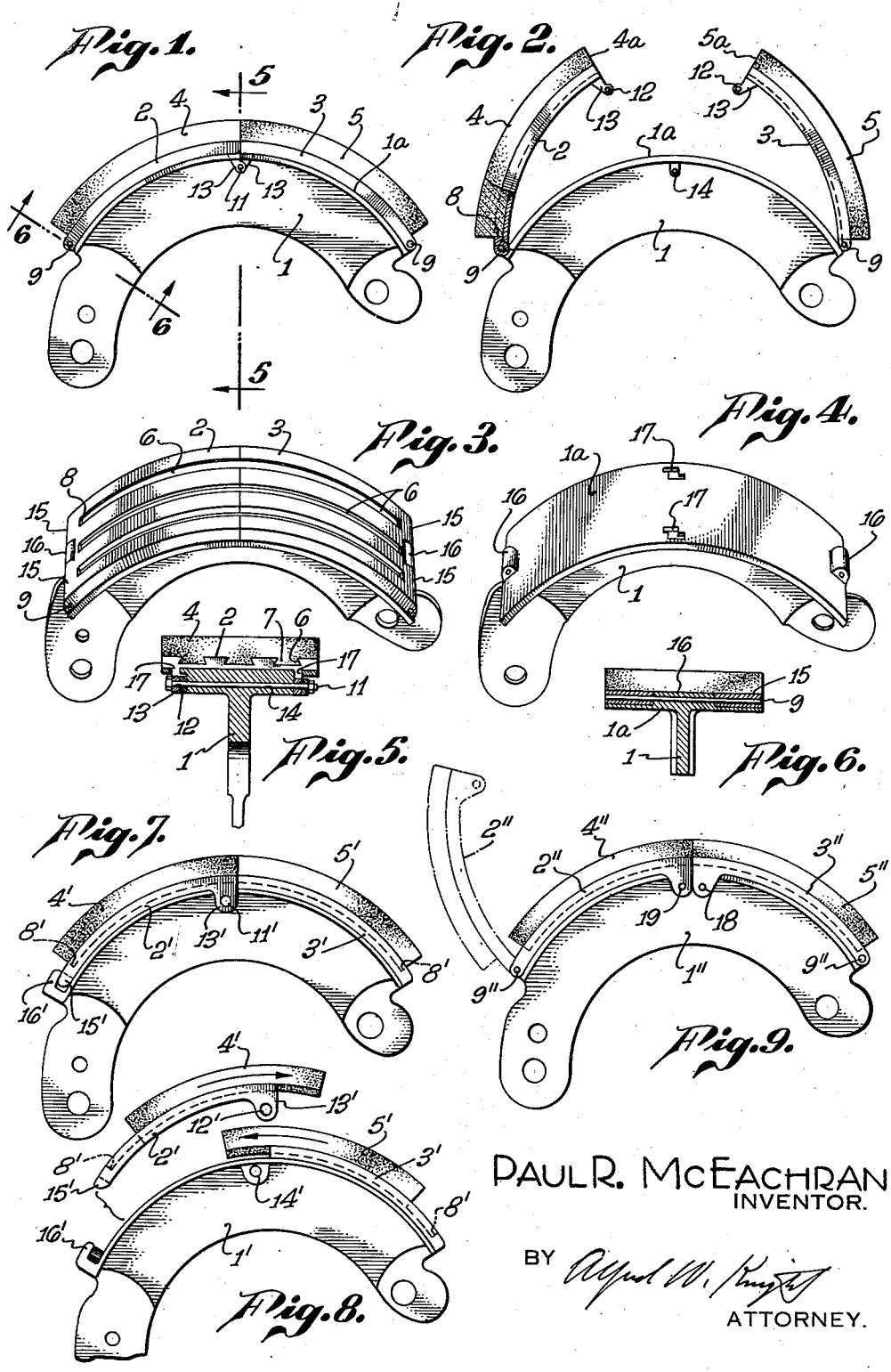

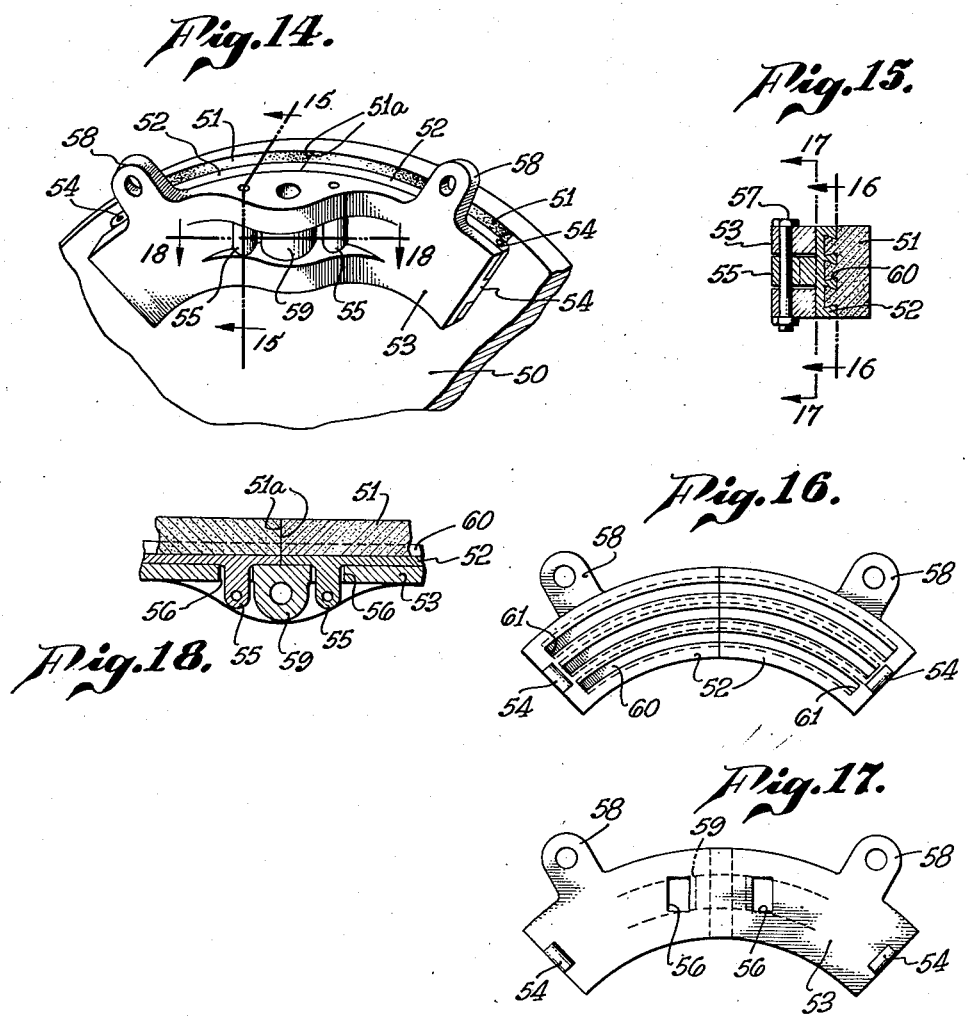

Patented Sept. 12, 1950

2,521,988

UNITED STATES PATENT OFFICE 2,521,988

BRAKE SHOE CONSTRUCTION

Paul R. McEachran, Downey, Calif., assignor of fifty per cent to Harold R. Pauley, Los Angeles, Calif.

Application February 21, 1945, Serial No. 578,984

4 Claims. (Cl. 188—240)

This application pertains to brake shoe devices, particularly those in which the friction element is readily detachable from the base or supporting portion of the device to permit ready "re-lining."

One of the principal objects of the invention is to provide a construction in which a plurality of friction elements are adapted for ready removal from the supporting base and in which adjacent friction elements coact with one another to prevent displacement in use.

A further general object of the invention is to provide a removable brake lining type of shoe construction which is equally adaptable to an internal expanding, an external contracting, or an axially movable brake shoe construction adapted for use in a disc type brake.

A further object of the invention is to provide a brake shoe construction including at least two friction elements arranged in abutting relationship in the direction of relative movement between the element and the member they are adapted to frictionally engage in use, in such manner that the elements cooperate to restrain each other against displacement under the forces imposed during such relative movement.

A further object of the invention is to provide a brake shoe construction including two cooperating friction elements elongated in the direction of relative movement between such elements and the member against which the elements are adapted to bear in a braking operation, such friction elements being arranged in an end-to-end relationship upon a base member, with their adjacent inner ends in abutting relation in such manner that the elements cooperate to restrain each other against displacement toward one another in use, and their respective spaced outer ends anchored upon said base member against outward displacement of said elements.

A further object of the invention is to provide a brake shoe construction including a base member and two friction elements elongated in the direction of relative movement between such elements and the members they are adapted to frictionally engage in a braking operation, in which the friction elements are arranged in an end-to-end relation upon said base member with their adjacent ends in abutting relation and their spaced ends pivotally secured to said base member.

The brake shoe construction of this invention may comprise, broadly, a shoe member which is adapted to cooperate with a relatively movable member (such as a "brake drum," for example), such shoe member including an elongated base member with elongated friction means slidably disposed thereon through the agency of longitudinally extending interlocking means on both such members, the base member being provided with shoulder means engaging one end of the friction means to prevent longitudinal movement thereof in one direction with respect to the base member, together with means for supporting the base member and the attached friction means in an operative position with relation to said relatively movable member and means independent of said base member engaging the other end of said friction means when in said operative position to prevent movement thereof in the opposite direction, the elongated base member and the attached friction means being movable to an assembly position in which the said other end of the friction means is freely exposed to permit removal thereof from the base member. In certain embodiments of the invention the base member or base members are pivotally attached to the supporting means whereby the base and friction members are moved rotationally into and out of the aforesaid operative position.

The above and other features of the invention will be brought out in or will be apparent from the ensuing description of certain illustrative embodiments shown in the accompanying drawings, in which:

Fig. 1 is a side elevation of one form of internally expanding type of brake shoe provided with two cooperating friction elements in normal operating position;

Fig. 2 corresponds to Fig. 1, and shows the cooperating friction elements in a displaced position which permits removal and replacement of the frictional wearing surface;

Fig. 3 is a perspective view of the shoe construction with the friction elements removed;

Fig. 4 is a view corresponding to Fig. 3, showing the base structure with the friction elements and their supporting bases removed;

Fig. 5 is a sectional view as taken on line 5—5 in Fig. 1;

Fig. 6 is a sectional view as taken on line 6—6 in Fig. 1;

Fig. 7 is a view corresponding to Fig. 1, showing a modification of the invention;

Fig. 8 is a view corresponding to Fig. 2, showing the modification of Fig. 7 in position permitting the replacement of friction elements;

Fig. 9 is a view corresponding to Fig. 1, showing a further modification of the invention;

Fig. 10 is a partly broken away view corresponding to Fig. 1 showing a further modification of the invention;

Fig. 11 is a sectional view as taken along line 11—11 in Fig. 10;

Fig. 12 is a broken away plan view as taken on line 12—12 in Fig. 10;

Fig. 13 is a sectional view as taken on line 13—13 in Fig. 10;

Fig. 14 is a partly broken away perspective view of a "slipper" type brake shoe construction in which the features of this invention have been incorporated;

Fig. 15 is a sectional detail thereof as taken on line 15—15 in Fig. 14;

Fig. 16 is a side elevation or face view of the supporting portion of the slipper construction with the friction elements removed, as taken on line 16—16 of Fig. 15;

Fig. 17 is a view corresponding to Fig. 16, showing the supporting portion with the friction elements and their supporting bases removed, as taken on line 17—17 in Fig. 15; and Fig. 18 is a sectional detail as taken on line 18—18 in Fig. 14.

In the form of the invention illustrated in Figs. 1 through 6, the brake shoe assembly is shown as comprising a bracket 1, adapted to be mounted within a housing or the like provided for an expanding type of brake. The bracket 1 carries two pivotally disposed base members 2 and 3 adapted to be disposed in a longitudinally alined operative relation as shown in Fig. 1 or to be pivotally moved into an opened (inoperative) position such as shown in Fig. 2 to facilitate the removal or insertion of frictional elements hereinafter more particularly described. In this form of the device each of the base members 2 and 3 is provided with a frictional element, as shown at 4 and 5, which is slidably mounted on the respective base member. The sliding attachment of the friction elements 4 and 5 to the base members 2 and 3 may be accomplished in any one of a plurality of ways, as through the agency of female dovetail 6 provided in the base member and co-acting male dovetail 7 provided in the friction element, the dovetails extending longitudinally of the base members, i. e., in the direction of relative movement between the brake shoe and the relatively movable element against which the desired friction engagement is to be effected in use. The female dovetails 6 extend from the inner end of the base members 2 and 3 towards the outer end and are terminated in abutments or shoulders 8 closely adjacent the pivotal mounting 9 of the base members upon the bracket 1. The friction elements 4 and 5 are removed from or inserted upon the corresponding base members 2 and 3 when the base members are in the opened (inoperative) position indicated in Fig. 2, and are pushed toward the shoulder means 8 and in engagement therewith. When the base members 2 and 3 are pivotally moved into the operative position of Fig. 1, the respectively inwardly directed ends 4a and 5a of the friction elements 4 and 5 are brought into abutment as shown in Fig. 1, and the base members 2 and 3 may be retained in this folded condition through the agency of a pin or bolt 11 which extends through openings 12 at the inner ends of the base members 2 and 3, the openings 12 being conveniently formed in lugs or projections 13 formed as part of the base members 2 and 3. A coacting opening 14 may be provided on the bracket 1 through which the pin or bolt 11 may be extended in the locking operation. The bracket 1 is preferably provided with a backing plate 1a adapted to underlie and support the members 2 and 3, and the pivotal mounting of the base members at 9 may be formed after the manner of a hinge, the respective hinge portions being provided through the agency of ears 15 on the base members 2 and 3 and a lug 16 on the bracket 1. The backing plate 1a may be cut away as indicated at 17, for reception of the lugs 13 which are provided on the base members 2 and 3.

The shoulder means 8 constitute means for retaining the friction elements 4 and 5 against movement to the right and left, respectively, while the inner end 4a of the element 4 restrains the element 5 against movement to the right and the inner end 5a of the element 5 restrains the element 4 against movement toward the left. The inner ends 4a and 5a of the elements 4 and 5 thus constitute abutment or shoulder means independent of the base members 2 and 3 and oppose movement of the friction elements in the directions which are respectively opposite the directions in which the respective shoulders 8 restrain the friction elements.

The alternative construction of Figs. 7 and 8 is functionally comparable to the form shown in Figs. 1–6, but the structural characteristics are modified to provide a more simplified construction. The bracket 1' corresponding to the bracket 1 is provided with a pivotally movable and entirely separable base member 2' at one end, and with a fixed base member 3' at the other end, formed integrally with or fixedly attached to the bracket 1'. The base members 2' and 3' carry longitudinally interlocked slidable friction elements 4' and 5'. Shoulder means 8' are provided at the respective spaced end of the members 2' and 3' against which the spaced ends of the elements 4' and 5' may abut in operative position. The base member 2' is pivotally mounted upon the bracket 1' at its outer end, as through the agency of transversely spaced ears 15' on the base member 2' adapted to engage a lug 16' on the bracket 1', the ears 15' being preferably rounded off at their lower surface to permit a free swinging movement, pivot-wise, of the base member away from the bracket, lifting the central or inner end away from the bracket, to a position such that the base member may be removed bodily from the bracket. The inner end of the base member 2' may be attached to the bracket 1' in operative position through the agency of a pin or bolt 11' extending through openings 12' which may conveniently be formed in lugs or projections 13' formed as part of the base member. A coacting opening 14' may be formed on the bracket 1' through which the pin or bolt 11' may be extended in the locking operation.

In order to replace a worn pair of friction elements in the structure, assuming the parts to be in the "operative" position of Fig. 7, the pin or bolt 11' may be removed, the base member 2' swung away from the bracket (thus separating the abutting inner ends of the friction elements 4' and 5'), to a position such as shown at the upper portion of Fig. 8. In this position, the element 4' may be withdrawn in the direction of the arrow appearing thereon in the drawing. The element 5' may be withdrawn from the base member 3' when the base member 2' is removed, by movement in the direction of the arrow appearing on said element. The base member 2' will be made of such circumferential length that upon its removal from the bracket 1' there will be ample room between the inner end of the base member 3' and the lug 16' to completely withdraw the friction element 5' from the interlocking means on the base member.

In the form of invention shown in Fig. 9 the base member 2'' (corresponding to the base member 2 in Fig. 1) is made of a somewhat greater length than is required according to Fig. 1, so that the base member may be swung pivotally about the pivot 9'' to lift the inner end away from the bracket 1'' and the other base member 3'' and permit removal of the element 4'' by sliding out of the base member 2'' after the manner of that employed in the form shown in Figs. 7 and 8, without disturbing the base member 3''. The base member 3'' may be bolted upon the bracket 1'' as indicated at 18, if desired, or pivotally mounted as in the case of the form shown in Fig. 1, and the inner end of the base member 2'' removably attached to the bracket as at 19. The position of the swung-out base member 2'' to permit the sliding removal of element 5'' is indicated in dot-dash lines in Fig. 9.

The alternative construction shown in Figs. 10 through 13 is entirely comparable to the forms shown in Figs. 1 through 6, but differing in that the base members corresponding to parts 2 and 3 of the first described form of the invention are formed as sheet metal parts 22 and 23 which are pivotally mounted upon the bracket 24 at as 25 (corresponding to the pivot 9—15—16 of the first form of the invention), and the inner ends of the base members 22 and 23 are interlocked with the bracket 24 through the agency of depending ears 26 provided with openings 27 alined with coacting openings in a lug 28 provided on the bracket 24, and held in position through the agency of bolts or the like 29. The formed sheet metal base members 22 and 23 are so shaped as to provide an attachment means such as of the dovetail type to form a longitudinally extending cooperation with the mating portions of the friction members which are indicated at 31. The hinge mounting 25 may be relied upon to provide an abutment shoulder 32 at the respective outer ends of the base members 22 and 23, corresponding to the abutment or shoulder 8 shown in the first form of the invention, and the friction members 31 may be attached to the base members in the same manner as that described above, i. e., by removing the bolt 29, opening the base members 22 and 23 to the opened position of Fig. 2, sliding the friction element into the cooperating engaging means provided by the dovetail slide portion into abutment with the shoulder 32, after which the base members may be folded downwardly into their longitudinally alined position indicated in Fig. 10 and the bolt 29 replaced. In this condition, the adjacent inner ends 31a of the friction elements 31 are brought into abutment and both friction elements are securely locked into position with respect to the bracket 24. Frictional effort upon the left-hand frictional element 31 in a left-hand direction will force this element against the adjacent abutment 32, and a corresponding frictional effort on the adjacent frictional element will be opposed by the abutment at the shoulders 31a, as will be apparent.

Figs. 14 through 18 illustrate the application of my invention to a disc type of brake shoe, and referring thereto, a disc member against which the frictional effort is to be applied is shown at 50, upon which a pair of arcuate friction elements 51 are adapted to bear. The elements 51 are carried by a pair of base members 52 which are arcuately shaped to conform to the elements 51 and are pivotally mounted at their respective outer ends upon a support 53, as at 54. The base members 52 are retained with respect to the support 53 through the agency of lugs 55 at their respective inner ends, which enter correspondingly shaped holes 56 in the support 53, said lugs being pinned to the support through the agency of bolts or the like 57 extending through coactingly disposed holes in the lugs and the support. Suitable guide lugs 58 may be provided for the support 53, whereby its axial travel toward and away from the disc 50 may be controlled, and such travel may be effected through the agency of an operating bar (not shown) extending through a lug 59 formed in the support. The frictional elements 51 may be secured to the respective base members 52 by means of a tongue-and-groove or dovetail structure, such as shown at 6 and 7 in Figs. 1-6, and indicated at 60, such dovetail structures being arranged concentrically about the axis of rotation of the disc 50, whereby the imposed frictional effort of the elements 51 upon the disc 50 will be directed along the length of such dovetail structures. Shoulder means are provided at the hinge ends of the base members, as at 61, and the inner ends 51a of the elements 51 are adapted to abut as in the prior described forms of the invention, whereby the frictional effort of the elements is transmitted to the support 53.

In all of the forms of the invention, the friction elements are arranged in coacting pairs, and the actual attachment of the friction elements to the base members of the supporting structure is attained through the agency of an interconnection which is freely slidable in the direction of application of frictional effort, the desired resistance to movement being secured by locking the respective elements of each pair against sliding movement in opposite directions by abutment against oppositely facing shoulder means and causing the elements to abut against one another to provide resistance to movement in the direction opposite to that resisted by said shoulder means.

The described forms of the invention are to be taken as illustrative only; other forms of the invention will occur to those skilled in the art and I choose rather to be limited to the scope of the subjoined claims.

I claim:

1. A brake shoe construction adapted to cooperate with a relatively movable member to establish a frictional load, which comprises: a pair of elongated base members longitudinally alined in end-to-end relation in the direction of relative movement of said construction and said movable member: support means for said base members; cooperating attachment means on said support means and said base members including pivot means at the respective spaced ends of said base members establishing said base members for pivotal movement relative to each other and to said support means; an elongated friction member slidably disposed upon each of said base members through the agency of longitudinally extending cooperating attachment means on said base members and said friction members; shoulder means on each of said base members at the respective spaced ends thereof, said friction members being adapted to engage the respective shoulder means at their spaced ends and being adapted to compressively engage each other at their adjacent ends in an end-to-end abutting relation.

2. A brake shoe construction adapted to cooperate with a relatively movable member to establish a frictional load, which comprises: a pair of elongated base members longitudinally alined in end-to-end relation in the direction of relative movement; support means for said base members; cooperating attachment means on said support means and said base members including pivot means at the respective spaced ends of each of said base members establishing said base members for pivotal movement relative to each other out of said end-to-end relation into an assembly position and for movement of one of said base members with respect to said support means; an elongated friction member slidably disposed upon each of said base members through the agency of longitudinally extending cooperating attachment means on said base members and on said friction members; shoulder means on each of said base members at the respective opposite spaced ends thereof, said base members being adapted to receive said friction members when disposed in said assembly position and said friction members being adapted to slide upon said base members into engagement with the respective shoulder means at their spaced ends, and being adapted to compressively engage each other at their adjacent ends in an end-to-end abutting relation when said base members are moved from said assembly position into said end-to-end relation.

3. A brake shoe construction as set forth in claim 1, and comprising in addition: locking means adapted to engage the other ends of said base members to retain said base members in said end-to-end relation.

4. In a brake shoe construction adapted to cooperate with a relatively movable member to establish a frictional load, the combination which comprises: two elongated base members longitudinally alined in end-to-end relation in the direction of relative movement of said movable member; separate elongated friction means slidably attached to each of said base members through the agency of longitudinally extending interlocking attaching means on each base member and on the respective friction means; and support means for said base members to establish said friction means in an operative position with relation to said relatively movable member and with the adjacent ends of the respective friction means in an end-to-end abutting relation with each other; each base member being provided with shoulder means engaging the opposite ends of the respective friction means; pivot means on one of said base members and on said support means to establish pivotal interconnection of said one base member to said support means at a position longitudinally removed from the position of said adjacent abutting ends of said friction means, whereby said one base member is mounted for movement with respect to said support means about an axis defined by said pivot means to an assembly position such as to separate the abutting end of the friction means carried by said one base member from the adjacent end of the friction means carried by the other of said base members and thereby freely expose both of said friction means for removal from the respective base members by longitudinal sliding movement thereof away from the respective shoulder means.

PAUL R. McEACHRAN.

REFERENCES CITED

The following references are of record in the file of this patent:

UNITED STATES PATENTS

| Number | Name | Date |
|---|---|---|
| 150,677 | Deering | May 12, 1874 |
| 658,856 | Mitchell | Oct. 2, 1900 |
| 1,117,366 | Gallagher | Nov. 17, 1914 |

FOREIGN PATENTS

| Number | Country | Date |
|---|---|---|
| 32,672 | Australia | Apr. 25, 1908 |